April 23, 1963
W. H. WEIDMAN
3,086,799
KEY-TYPE MOUNTING
Filed March 17, 1960
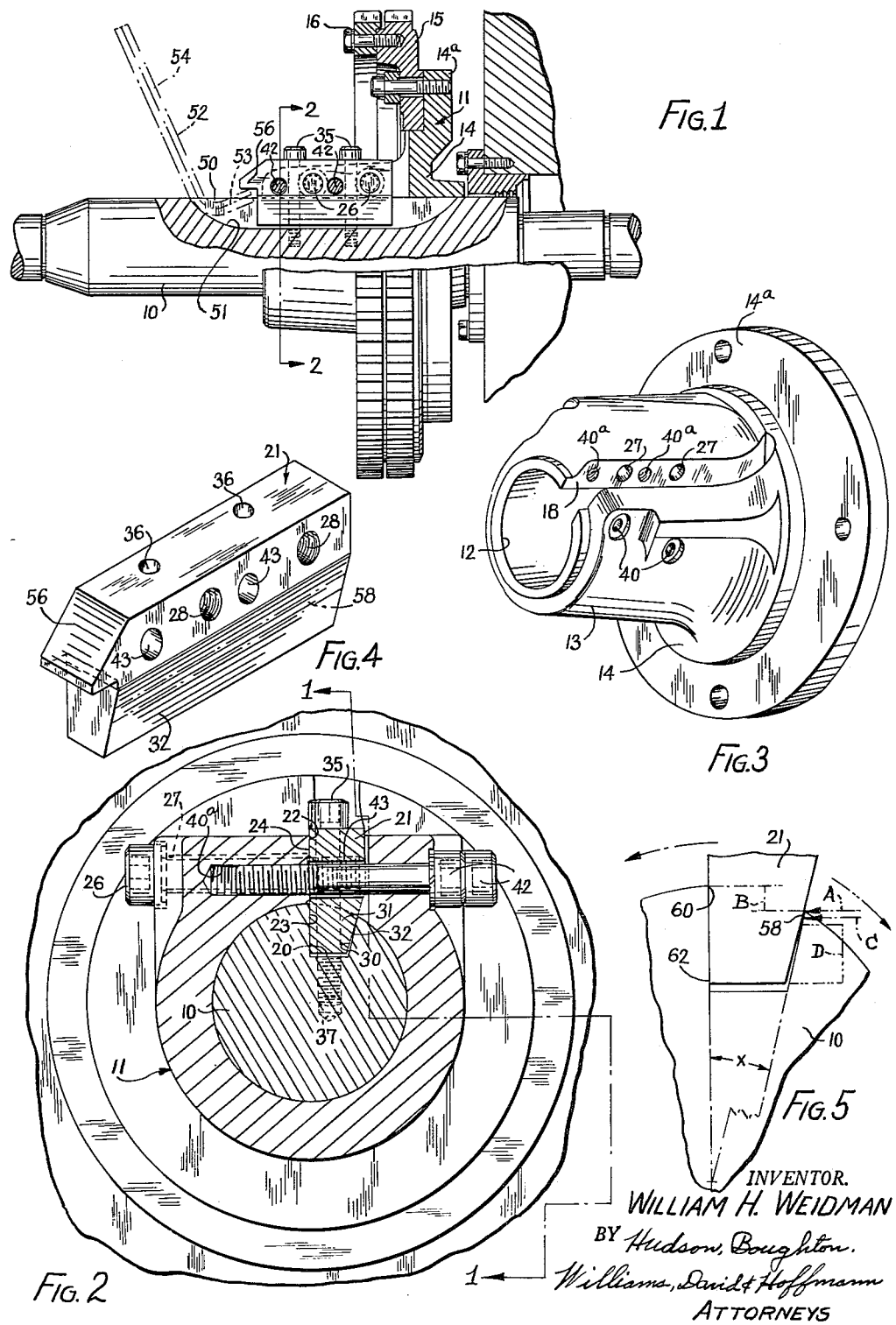
INVENTOR.
WILLIAM H. WEIDMAN
BY Hudson, Boughton.
Williams, David & Hoffmann
ATTORNEYS United States Patent Office 3,086,799
Patented Apr. 23, 1963

3,086,799
KEY-TYPE MOUNTING
William H. Weidman, Maple Heights, Ohio, assignor to Harris-Intertype Corporation, Cleveland, Ohio, a corporation of Delaware
Filed Mar. 17, 1960, Ser. No. 15,643
13 Claims. (Cl. 287—52.05)

The present invention relates to a connection of the key type for connecting coaxially disposed members for rotation or oscillation as a unit.

Keys are most commonly used to connect a shaft and a member disposed coaxially thereabout, such as a gear, in driving relationship. The conventional or known type of key connections wear when embodied in a drive when sudden loads are imposed on the connection as when quickly starting, stopping, or reversing the drive. Furthermore, as the wearing occurs, the key connection will develop play and will not maintain the member and shaft in a predetermined angular relationship or square on the shaft as is often necessary for the proper operation of the apparatus in which the members are embodied. While various types of tapered keys have been heretofore provided to assure a tight connection, the keys have been such that they tend to expand the hub of the member disposed on the shaft, thereby distorting still further the shaft opening in the hub and still further tending to distort the keyways for the keys thereby adding to a key fitting problem when the keys must be replaced. Furthermore, tapered keys often tend to make the shaft and hub eccentric with respect to each other. Furthermore, the known types of key connections do not embody keys which are as readily replaceable as is desirable and often require dismantling or moving of various parts.

An important object of the present invention is to provide a new and improved key-type drive connection which overcomes the disadvantages of the known key-type drive connections heretofore enumerated.

Another object of the present invention is to provide a new and improved key-type drive connection wherein the key may be readily adjusted to take up any slack caused by wearing of the key or keyway and wherein the key is readily replaceable.

Yet another object of the present invention is to provide a new and improved key-type drive connection wherein the key is, in effect, a part of one or both of the members which it connects in driving relationship.

Still another object of the present invention is to provide a key-type driving connection for connecting two coaxially disposed members for rotation as a unit, which connection is such that a precise relative angularity of the members may be readily obtained and checked.

A further object of the present invention is to provide a new and improved key-type drive connection between coaxially disposed members to connect the members to rotate as a unit and in which the key and shaft keyway cooperate to set up moment arms for the forces resisting relative movement between the two members connected by the key regardless of which direction the forces tend to relatively rotate said members.

A still further object of the present invention is to provide a new and an improved key-type connection for connecting coaxially disposed members to rotate as a unit in which the problem of key fitting is substantially eliminated, for all practical purposes, when a key is to be replaced.

It is also an object of the present invention to provide in a drive connection having a hub keyed to a shaft a construction which is such that a clamping force may be beneficially applied to clamp the hub onto the shaft and without the detrimental effect of known key connections.

It is a further object of the present invention to provide a drive connection of the key type with a shaft and a member thereon which is so constructed and arranged that the member can be readily assembled concentrically with the shaft and in proper angular relationship with respect thereto.

Further objects and advantages of the present invention will be apparent from the following detailed description of the the preferred embodiment thereof made with reference to the accompanying drawings forming a part of the present specification and in which:

FIG. 1 is a view, with parts cut away, of a shaft and gear connected by a connection embodying the present invention;

FIG. 2 is a sectional view taken approximately along line 2—2 of FIG. 1;

FIG. 3 is a detailed view of the hub of the gear shown in FIG. 1;

FIG. 4 is a detailed view of the key used in the connection of FIG. 1; and

FIG. 5 is a force diagram showing forces resisting relative rotation between the shaft and gear hub with portions of the parts being somewhat exaggerated for purposes of clarity.

While the present invention is susceptible of various modifications and constructions and of use in various mechanisms where two coaxially disposed members are connected by a key to rotate as a unit, it is particularly useful for connecting a gear to a shaft in a drive when it is necessary to maintain the gear and shaft coaxial and in a predetermined angular relationship as in the reversing drive for a printing press shown in United States Patent No. 2,659,237. Furthermore, the key connection of the present invention is particularly suitable for use in those applications where sudden loads are applied to the key as when a machine embodying the members connected by the key is quickly started, stopped, or reversed.

Referring to the drawings, the preferred form of the present invention is illustrated therein and comprises a shaft 10 having a member 11 disposed coaxially thereabout. The member 11 has an opening 12 therein which receives the shaft 10 and may be said to comprise a hub portion 13 and a flange portion 14 including a flange 14a which extends radially outwardly of the hub portion 13 at one end thereof. A gear 15 is bolted to the flange 14a and, in the illustrated embodiment, a second backlash gear 16 is bolted to the gear 15.

The hub portion 13 has an axially extending slot 18 therein which extends from the outer end of the hub portion 13 remote from the flange 14a to a point adjacent the inner side of the flange 14a. The slot 18 opens into the outer periphery of the hub portion 13 and into the opening 12 for receiving the shaft 10. The slot 18 registers with a keyway 20 in the shaft 10 and a key 21 is disposed in the slot 18 and received in the keyway 20 to connect the member 11 and the shaft 10 to rotate as a unit. The slot 18 is wider than the key 21 so that a portion of the key 21 is received by the slot 18 with clearance. The key 21, however, is wedged into the keyway 20.

The slot 18 and the keyway 20 have sides 22, 23, respectively, which are, in the illustrated embodiment, coplanar with each other and the key 21 has a side 24 which is adapted to mate against the coplanar sides 22, 23. The key 21 is clamped to the side 22 of the slot 18 by a plurality of bolts 26 which extend through the hub portion 13 and thread into the key 21. The bolts 26 are each received in an individual opening 27 in the hub portion 13 which extends perpendicularly to the side 22 of the slot 18 and which is of slightly larger diameter than the bolt 26 received therein for purposes which will be explained hereinafter. The bolts 26 thread into tapped holes 28 in the key 21, the tapped holes 28 extending perpendicularly to the side 24 of the key which mates with the sides 22, 23 of the slot 18 and the keyway 20.

The side of the keyway 20 opposite the side 23 and designated by the reference numeral 30 is inclined with respect to the side 23 and diverges approximately radially outwardly of the shaft from the side 23. The portion of the key received by the keyway 20 and designated by the reference numeral 31 has a tapered side 32 which is adapted to mate against the side 30 of the keyway 20. The side 32, however, is inclined at a slightly greater angle with respect to the side 24 of the key than the angle of inclination of the side 30 of the keyway with its opposite side 23 to provide a wedging action of the key as the portion 31 is received in the keyway 20. The key 21 is drawn snugly into the keyway 20 in a wedging manner by tightening a plurality of bolts or machine screws 35 which extend through the key 21 from the outer side or top thereof and thread into the shaft at the bottom of the keyway 20. The bolts or machine screws 35 are each received in an individual opening 36 which extends through the key 21 from the outer side thereof to the inner side thereof and parallel to the side 24, the screws 35 each threading into a tapped hole 37 in the shaft 10.

In addition to the openings 28 for receiving the bolts 26 which clamp the key 21 against the side 22 of the slot 18, the hub portion 13 has a plurality of openings 40 therein on one side of the slot 18 which are aligned with corresponding tapped openings 40a on the opposite side of the slot. The openings 40, 40a extend perpendicular to the side 22 of the slot 18 and each pair of aligned openings 40, 40a receives a bolt 42 which extends through the hub and the key 21 and threads into the tapped opening 40a. The key 21 has openings 43 therein which receive the bolts 42, with the openings 43 being larger than the shank of the bolts 42 to accommodate relative movement between the bolts 42 and the key 21.

In assembly, the member 11 is placed on the shaft 10 in approximately its proper position adjacent the keyway 20. The slot 18 is aligned with the keyway 20 and the key 21 dropped into the slot 18 and the keyway 20. The screws 35, 26 and 42 are then inserted and started into the receiving tapered openings. After the screws 35, 26, 42 have been started, the screws 35 are torqued to wedge the key 21 into the keyway 20. After the screws 35 have been torqued, the screws 26 are then tightened to clamp the key 21 against the side 22 of the slot 18. After the torquing of the screws 26, the screws 42 are torqued.

The torquing of the screws 35 connects the key 21 to the shaft 10 and makes it similar to an integral part of the shaft, while the torquing of the screws 26 clamps the key 21 to the member 11 and makes it similar to an integral part of the member 11. Consequently, the drive betwene the members is more in the nature of an integral connection rather than of a conventional type of key connection. As is understood by those skilled in the art, an integral connection will be less subject to wear than the conventional key and keyway type connection.

The torquing of the screws 42 tends to compensate for any slight out-of-roundness initially produced by the wedging of the key 21 into the keyway 20, and clearance between the side of the key 21 not clamped against the member 11 and the adjacent side of slot 18 allows the compensation and eliminates wear between the adjacent surfaces as caused by key deflection when sudden forces are applied tending to produce relative rotation between the member 11 and the shaft 10.

Attention is also directed to the fact that, when the key is seated, a clearance is also present between the bottom of the key 21 and the bottom of the keyway 20. The clearance and the tapered construction of the key allow the key to be adjusted in the event of wear, by loosening the screws 26 and 42 and tightening the screws 35, 26 and 42 in the described manner. As is apparent from the foregoing, ready access is available to the key 21 and to the bolts 26, 35 and 42 which control the key.

It is now apparent to those skilled in the art that the clearance between the shank of the bolts 42 and the key 21, and between the shank of the bolts 26 and the member 11 is necessary to accommodate substantially radial movement of the key 21 relative to the bolts and to the member during the key setting operation.

Preferably, the side 23 of the keyway 20 lies along a radius of the shaft 10. When this is true, the accuracy of the keyway may be readily checked by merely determining whether or not the side 23 is radially extending.

To facilitate removal of the key 21 in the event that it ever becomes necessary, the keyway 20 extends beyond the key 21 at the end of the key adjacent the outer end of the hub portion 13 and the bottom of the keyway may be curved upwardly at this portion to the outer periphery of the shaft 10, as is best shown in FIG. 1. The portion of the keyway extending outwardly of the key is designated by the reference numeral 50, and the curved bottom portion by the reference numeral 51. The portion 50 of the keyway will accommodate a lifting tool 52 having an end portion 53 extending transversely of a handle portion 54 and which is adapted to be inserted into the portion 50 of the keyway 20 and rest on the bottom 51 while the outer end of the portion 53 engages a lip 56 on the adjacent end of the key 21. The tool 52 is preferably a wrench used for operating the screws 35, 26 and 42. The point of engagement of the tool with the bottom 51 provides a fulcrum for lifting the key from the slot 18. It can readily be seen by reference to FIG. 1 that, by merely pushing or pulling on the handgrip portion 54, the key 21 may be readily lifted from the keyway 20 after removing the bolts 26, 35 and 42. The removal of the key does not require the demounting of the shaft 10 or the disassembly of the member 11 from the shaft.

Attention is also directed to the fact that the slot 18 need not extend the axial extent of the member 11 but terminates adjacent the inner side of the flange portion 14a. This means that the side walls of the opening 12 inwardly of the flange 14a are not weakened and this aids in maintaining the concentricity of the member 11 with respect to the shaft, as well as the member square on the shaft.

When the key 21 is properly seated in the keyway 20 and bolted or clamped against the side 22 of the slot 18, the side 24 of the key mates against the coplanar sides 22, 23 of the slot 18 and the keyway 20. The tapered side 32 of the key 21 will engage the adjacent side 30 of the keyway along a locus 58 extending axially along the side 30 and indicated in dot-dash lines on the side 32 of the key 21 in FIG. 4. It will be appreciated by those skilled in the art that, when a force is applied which tends to rotate the shaft 10 in a clockwise direction with respect to the member 11, as they are viewed in FIG. 5, the key 21 will tend to rotate counterclockwise about the locus 60 of engagement of key and keyway adjacent the outer edge of the side 23 of the keyway 20 and this turning movement will be resisted by a force A set up as a result of the engagement of the key 21 and shaft 10 along the outer axially extending side of locus 58. This resisting force acts through a moment arm B, indicated in FIG. 5, to resist rotation of the key 21 and is a function of the clamping torque applied by screws 35 and an inverse function of tan X. It will be noted that the moment arm B is the normal distance from the line of force A to the outer of the side 23. This moment arm B increases the resistance of the connection to forces which tend to rotate the shaft 10 clockwise relative to the member 11 or the member 11 counterclockwise with respect to the shaft. If a force is applied which tends to rotate the member 11 clockwise with respect to the shaft 10 or the shaft 10 counterclockwise with respect to the member 11, the key will tend to rotate about the locus 62 of the engagement of the side 24 of the key 21 with the side 23 of the keyway adjacent the inner end of the side 24, i.e., the end adjacent the bottom of the keyway, and this will be resisted by a force due to the locus of engagement 58 of the key side 32 with the side 30 of the keyway to provide a resisting force C which acts through a moment arm D to resist relative rotation between the members. It will be noted, then, that the forces resisting relative rotation of the members 10 and 11 always act through a moment arm. This is true because the locus 58 lies between the loci 60, 62. When the locus 58 is described as lying between the loci 60, 62, it will be understood that the locus 58 is positioned to produce moment arms and that the locus 58 is considered as being between the loci 60, 62 whenever the locus is between the outer axially extending edges of the loci 60, 62 projected onto a plane parallel to the plane containing the loci 60, 62 and through the locus 58 so that forces acting at locus 58 to oppose rotation about loci 60, 62 will act through moment arms.

From the foregoing, it can be seen that the present invention provides a key-type drive connection between two coaxially disposed members which are connected by the key to rotate as a unit which facilitates assembly of the key without causing undue distortion of the parts assembled thereby, even though the key is a tapered key, and which is not subject to wear when compared to similar key-type drive connections presently known to the art. Furthermore, the key may be readily adjusted when, or if, wear does occur without disassembly of the members connected by the key, and the key during operation functions more in the nature of a part integral with one or both of the members than as a separate key, as has heretofore been true of key-type connections. Furthermore, the drive connection is such that any out-of-roundness of the shaft due to the wedging of the tapered key therein tends to be compensated by forces applied by the members disposed about the shaft. Furthermore, the key does not tend to distort the hub member and is easily removed and readily accessible for adjustment.

While the preferred embodiment of the present invention has been described in considerable detail, further modificaitons, constructions and arrangements within the ability of those skilled in the art can be made, and it is hereby my intention to cover all such constructions, modifications, constructions and arrangements with the ability of those skilled in the art and the scope and spirit of the present invention.

Having thus described my invention, what I claim is:

1. In combination, a shaft member, a second member disposed on said shaft member and having an axially extending shaft member opening therein receiving said shaft member, said second member having an axially extending slot opening into said shaft opening and said shaft member having an axially extending keyway adjacent said slot, said slot and keyway having first coplanar axially extending sides, a key interconnecting said second member and said shaft member and having a first portion received in said slot and a second portion received in said keyway, said keyway having a second side opposite to said first side of said keyway diverging outwardly from said first side, said key having a first planar side common to said portions and engaging said first sides of said keyway and slot and said second portion of said key having a tapered second side diverging outwardly with respect to the first side of said key at an angle greater than the angle of divergence of said second side of said keyway with respect to said first side of said keyway whereby said second portion is wedgingly received in said keyway and clamping means engaging said key and urging said key inwardly into said keyway.

2. In combination, a shaft, a member having a hub mounted on the shaft, said member having an axial bore therethrough of a diameter adapted to closely fit said shaft and further having an axially extend slot communicating with said bore and with the exterior of said hub, said shaft having an axially extending keyway, a key received in and closely fitting said keyway and received in and fitting said slot with clearance between the sides of the slot and the key, removable means securing the key to said hub on one side of said slot, and removable means clamping the portions of the hub on each side of the slot toward each other, there being clearance between said key and the other side of said slot when said hub is clamped by said removable means for clamping the hub.

3. In combination, a shaft member, a second member disposed about and coaxial with said shaft member and having an axially extending opening therein receiving said shaft member, a unitary key interconnecting said members and received in registered keyways therein, said keyway in said shaft member having axially extending sides which diverge outwardly from each other and said key having a tapered portion received in said keyway in the shaft member with the tapered portion having sides diverging outwardly at a greater angle than the angle of divergence of said sides of the shaft keyway whereby the tapered portion is wedgedly received in said shaft keyway, and clamping means engaging said key and adapted to force said key inwardly toward the bottom of the shaft keyway to wedge said key in said keyway in said shaft member.

4. In combination, the structure as defined in claim 3 wherein said clamping means comprises bolts received in said key and said shaft member and extending generally perpendicular to the bottom of the keyway in said shaft member.

5. In combination, the structure as defined in claim 3 wherein the depth of said key relative to the shaft keyway is such that there is clearance between the bottom of the key and the bottom of the keyway in the shaft member.

6. In combination, the structure as defined in claim 3 wherein said keyway in said second member is defined by split portions of said second member which are adapted to be clamped toward each other to apply a clamping force to said shaft member, and said structure further comprises additional clamping means engaging said portions and applying a clamping force urging said split portions toward each other.

7. In combination, the structure as defined in claim 3 wherein further clamping means effects the clamping of said key to said second member, said further clamping means having a part engaging and directly applying a clamping force to said key.

8. In combination, the structure as defined in claim 7 wherein said keyway in said second member is defined by split portions of said second member which are adapted to be clamped toward each other to apply a clamping force to said shaft member, and said structure further comprises additional clamping means engaging said portions and applying a clamping force urging said split portions toward each other.

9. In combination, the structure as defined in claim 7 wherein clearance is present between said key and one side of said keyway and said further clamping means clamps said key to the other side of said keyway in said shaft member.

10. In combination, the structure as defined in claim 3 including further clamp means providing relative radial adjustment relative said shaft member between the further clamp means and key for clamping said key to said second member, said further clamp means having a part engaging and directly applying a clamping force to said key and there being clearance between the bottom of said keyway in said shaft member and said key.

11. In combination, the structure as defined in claim 10 wherein said further clamp means comprises bolt means received in said second member and said key and engaging said key to apply the clamping pressure directly thereto.

12. In combination, a shaft member, a second member disposed about and coaxial with said shaft member and having an axially extending opening therein receiving said shaft member, a key interconnecting said members and received in substantially registered axially extending keyways therein; said keyways each having axially extending first and second sides between which said key is disposed, and clamping means applying clamping forces to said key to urge said key against each of said members and comprising first clamp means having portions separate from said first sides of said keyway engaging said key and applying clamping pressure to said key for clamping said key against said second side of said keyway in said second member, and second clamp means for applying clamping pressure to said key urging said key into engagement with said shaft member to clamp said key against said shaft member.

13. In combination, a shaft member, a second member disposed about and coaxial with said shaft member and having an axially extending opening therein receiving said shaft member, a key interconnecting said members and received in registered axially extending keyways therein, said keyways each having axially extending sides between which said key is disposed, and clamping means applying clamping forces to said key to urge said key against each of said members and comprising first clamp means including bolt means received in said key and said second member for clamping said key against one of said sides of said keyway in said second member and second clamp means including bolt means received in said key and said shaft member for applying a clamping force to said key urging said key into engagement with said shaft member to clamp said key against said shaft member, said bolt means extending transversely of each other.

References Cited in the file of this patent

UNITED STATES PATENTS

| | | |
|---|---|---|
| 164,609 | Thomas | June 15, 1875 |
| 540,448 | Lagergren | June 4, 1895 |
| 2,444,922 | Deetman | July 13, 1948 |